Oct. 17, 1939.   H. TANNER   2,176,157
CHECKERWORK
Filed Dec. 7, 1938   3 Sheets-Sheet 1

Inventor:
Henry Tanner
by Davis, Lindsey, Smith & Shonts
Attys.

Oct. 17, 1939.      H. TANNER      2,176,157
CHECKERWORK
Filed Dec. 7, 1938        3 Sheets-Sheet 2

Inventor:
Henry Tanner.
by Davis, Lindsey, Smith & Shonts
Attys.

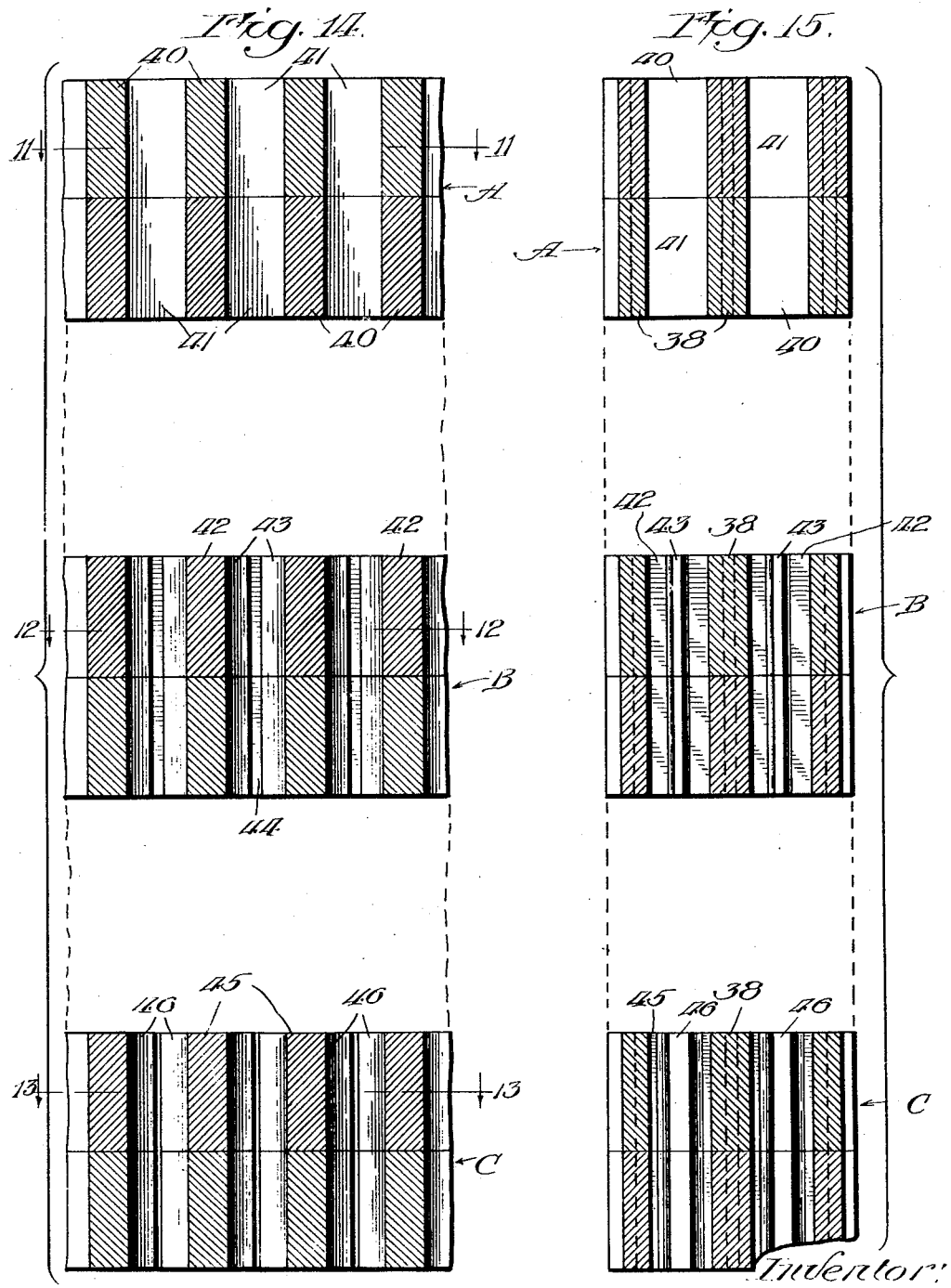

Patented Oct. 17, 1939

2,176,157

UNITED STATES PATENT OFFICE 2,176,157

CHECKERWORK

Henry Tanner, Chicago, Ill., assignor to Chicago Retort and Fire Brick Company, Chicago, Ill., a corporation of Illinois Application December 7, 1938, Serial No. 244,346

1 Claim. (Cl. 263—51)

My invention relates to checkerwork for regenerative furnaces and particularly to those employed in conjunction with open hearth, blast, glass house tank furnaces, and melting and reducing furnaces generally.

One object of my invention is to provide a checkerwork having a plurality of horizontal and vertical flue passages through which the gas flows while being subjected to frequent changes of direction and accompanying turbulence for insuring an optimum interchange of heat between the gas and bricks comprising the checkerwork, the bricks being securely interlocked to provide for maximum stability of the structure.

A further object is to devise a checkerwork of the nature indicated which is characterized by economy in structural cost through being composed of a relatively large percentage of standard straights.

A further object is to devise a checkerwork having the weight and heating surface per unit volume of the checkerwork required for maximum heat storage and further characterized by an adaptability to any kind of fuel due to a capacity for utilizing various sizes of straights to form any desired size of flue opening.

A further object is to provide a checkerwork for blast furnace stoves in which the cross-sectional areas of the flues decrease from the top to the bottom of the structure, thus compensating for the change in the unit volume of gas passing therethrough and promoting the most efficient exchange of heat between the bricks and gas.

A further object is to devise a stove checkerwork in which the variation in flue area is accomplished by inserts in the flues forming a part of the cross members of the structure.

These and further objects of my invention will be set forth in the following specification, reference being had to the accompanying drawings, and the novel means by which said objects are effectuated will be definitely pointed out in the claim.

In the drawings:

Figure 1 is a fragmentary, sectional plan view of one type of my improved checkerwork, as viewed along the line 1—1 in Fig. 2, looking in the direction of the arrows;

Figs. 2 and 3 are sections along the lines 2—2 and 3—3 in Figs. 1 and 2, respectively, looking in the direction of the arrows;

Figure 1:
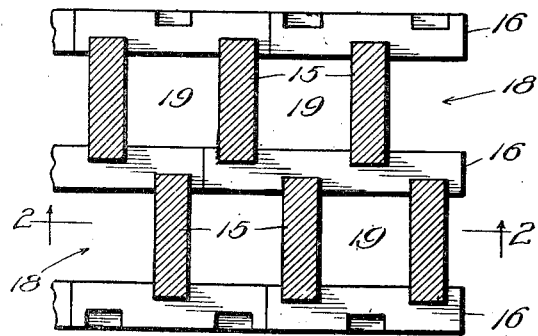
Figure 2:
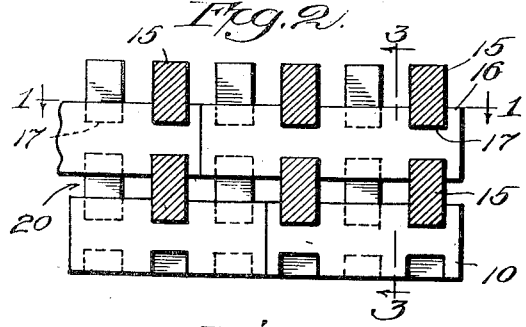
Figure 5:
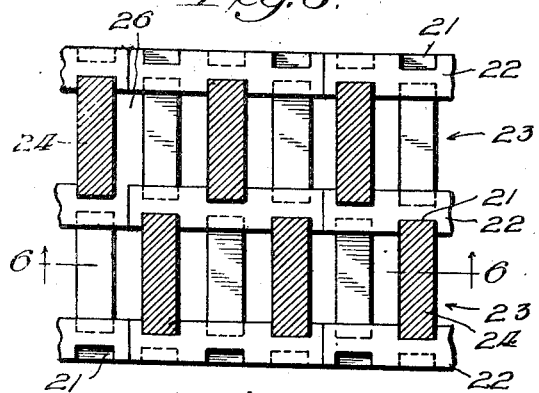
Fig. 5 is a fragmentary, sectional plan view of another type of checkerwork, as viewed along the line 5—5 in Fig. 6, looking in the direction of the arrows.
Figure 7:
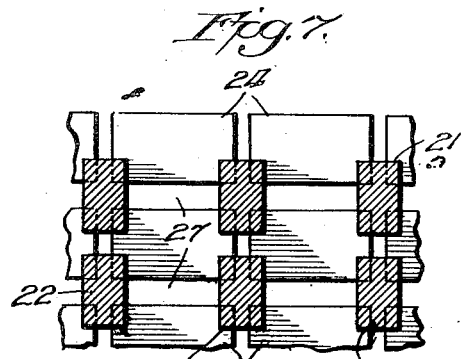
Figure 6:
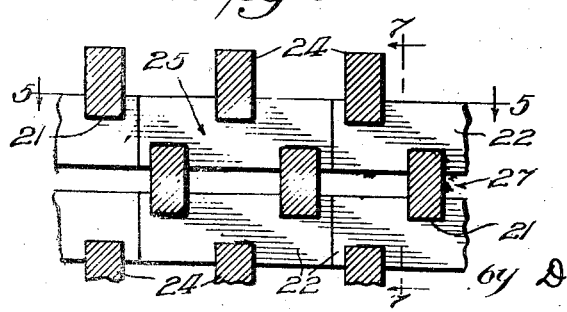
Figure 8:
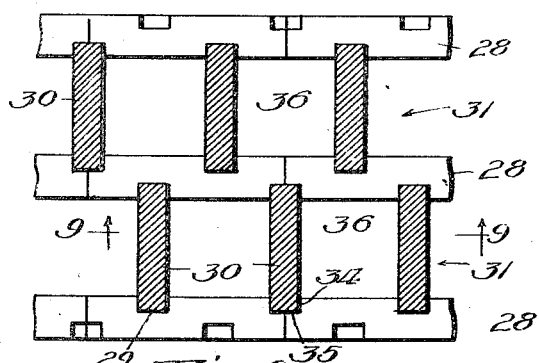
Figure 10:
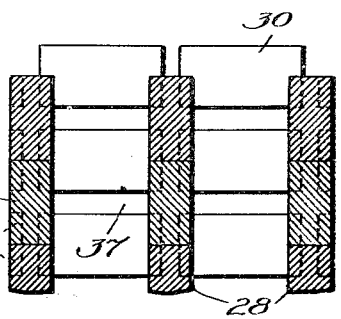
Figure 9:
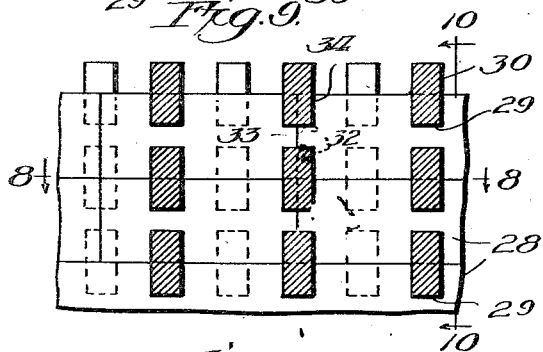
Figure 11:
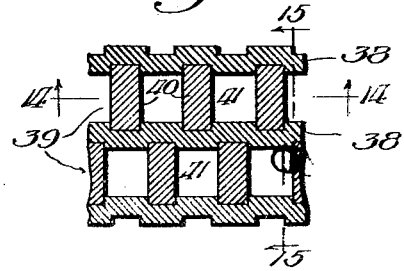
Figure 13:
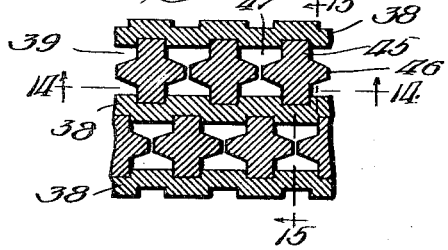
Figure 12:
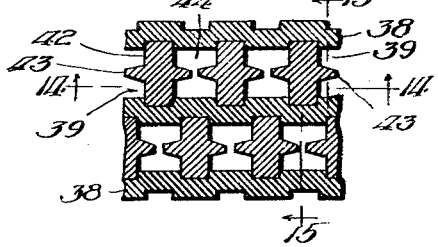

Figs. 6 and 7 are sections along the line 6—6 and 7—7 in Figs. 5 and 6, respectively, looking in the direction of the arrows;

Fig. 8 is a fragmentary, sectional plan view of a third type of checkerwork, as viewed along the line 8—8 in Fig. 9, looking in the direction of the arrows;

Figs. 9 and 10 are sections along the lines 9—9 and 10—10 in Figs. 8 and 9, respectively, looking in the direction of the arrows;

Figs. 11, 12 and 13 are sections along the lines 11—11, 12—12, and 13—13, respectively, in Fig. 14, showing the cross members employed in the checkerwork assembly for a regenerative furnace, illustrated in Fig. 14, to provide a decreasing cross-sectional area of the vertical flue passages from the top to the bottom of the assembly;

Fig. 14 is a diagrammatic view of a regenerative furnace, such as a blast furnace stove, showing upper, intermediate and lower checkerworks arranged to provide decreasing cross-sectional areas in the vertical flues from the top to the bottom of the furnace, the view being taken along the lines 14—14 in Figs. 11, 12 and 13, looking in the direction of the arrows; and Fig. 15 is a further section of the furnace shown in Fig. 14, taken along the lines 15—15 in Figs. 11, 12 and 13, looking in the direction of the arrows;

Referring to Figs. 1 to 4, inclusive, which illustrate one type of my improved checkerwork, and more particularly to Fig. 2 thereof, the numeral 10 designates a brick which, in conjunction with others having similar characteristics, are laid end to end on their long edge surfaces to form a plurality of horizontal courses that are spaced from each other as hereinafter described. For purpose of describing the checkerwork, it will be assumed that the lowermost course of these bricks, as shown in Fig. 2, constitutes a lowermost course of the checkerwork assembly and, under these conditions, it will be understood that the indicated course and others similarly situated rest on a suitable substructure (not shown) and that the complete assembly is enclosed within suitable walls (also not shown), neither of which form any part of the present invention.

Figure 4:
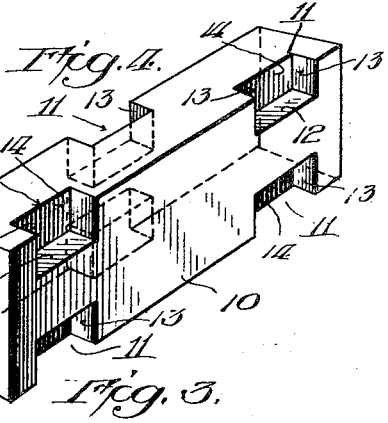
Fig. 4 is an enlarged, perspective view of one of the bricks in the lower course of the checkerwork shown in Fig. 2.

The bricks 10 may be made in any shape and according to any desired dimensions and may be formed as a rectangular prism (see Fig. 4). When so formed, a plurality of notches 11 are cut inwardly from the opposed, major faces of the brick and each notch is defined by horizontal bearing surface 12, vertical end surfaces 13, and a vertical back surface 14, all for a purpose hereinafter explained. The arrangement of these notches in each brick may be varied as operating conditions require, but, when used in the special assembly under consideration, four notches are provided in one major face of the brick arranged in pairs adjacent each end of the brick. Each of these pairs comprises an upper and a lower notch that are cut inwardly from the upper and lower surfaces of the brick when laid lengthwise. A third pair of such notches is formed in the opposite major face of the brick and the notches of this pair are similarly related to the upper and lower surfaces of the brick, but are disposed intermediate the ends thereof. In laying each course of these bricks, as illustrated in Fig. 2, successive bricks are reversely positioned to insure a proper spacing of the cross members or straights as hereinafter described.

The width of each notch 11 is such as to easily and interlockingly receive one end of a standard straight brick, known in the trade as a "straight", and designated in the drawings by the numeral 15, while the depth of the horizontal bearing surface 12 is sufficient to provide an adequate support for these straights and the height of each notch is arranged to accentuate the aforesaid interlocking.

Figure 3:
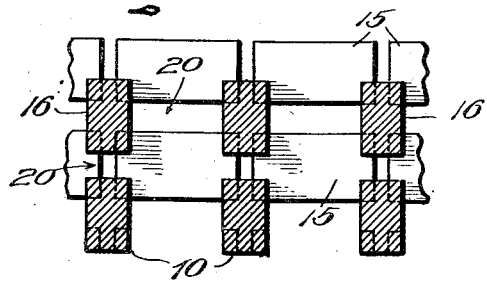

The straights 15 space the horizontal, lower courses of the bricks 10, as clearly illustrated in Fig. 3, and resting on the upper ends of the straights are bricks 16 which are laid end to end on their long edge surfaces to provide a second group of spaced courses that is disposed above the lower group, but with the elevated courses in respective vertical alignment with the lower courses.

In the special type under consideration, each brick 16 is designated as having a greater length than the brick 10, so that the abutting end faces between the bricks 16 are offset with respect to the abutting end faces of the bricks 10 in the vertically aligned courses, as illustrated in Fig. 2. It will be understood, however, that the bricks may be arranged as circumstances may require and that all of the courses which employ notched bricks may be made wholly from the bricks 10, or wholly from the bricks 16, or by utilizing courses of these respective bricks alternately.

The greater length of each brick 16 requires a slightly different disposition of notches 17, it being understood that each notch 17 is formed and dimensioned like each notch 11. In order to provide for the arrangement of the straights 15, as illustrated, each major surface of the bricks 16 will be provided with four notches 17 arranged in pairs of notches, as generally illustrated in Fig. 4, but with each pair of notches on one major surface offset with respect to a pair of notches on the opposed major surface. In each course, then, the bricks 16 are laid end to end and the straights extending between each pair of adjacent vertical walls formed by the bricks 10 and 16 are disposed in a series of vertical files, with the straights in each file being vertically aligned.

The horizontal spacing of the courses formed by the bricks 10 and 16 and the vertical alignment of these respective courses provide vertical wells 18 (see Fig. 1) which extend from top to bottom of the checkerwork, while the spacing of these courses by the straights 15 operates in conjunction with the vertical course walls to define vertical flues 19 that also extend from top to bottom of the checkerwork. Horizontal flues throughout the checkerwork assembly are formed by the spacing of each pair of adjacent, vertically aligned courses, and these horizontal flues are designated by the number 20 in Figs. 2 and 3. In other words, the bricks 10 and 16 vertically and horizontally space the straights and are similarly spaced by the straights. Further, in each adjacent pair of vertical wells 18, the notches in the respective courses may be arranged to provide a relative offsetting of the straights 15 in adjacent wells.

In Figs. 5 to 7, inclusive, there is illustrated a further modification of my improved checkerwork in which the notches 21, corresponding to the notch 11, are arranged in each brick 22 from which the horizontal courses of notched bricks are formed, so that, within each vertical well 23 formed by these courses, the straights 24 which space the vertical walls defining these wells, as hereinbefore described in connection with Fig. 1, are arranged in horizontal spaced rows, with the straights in each row offset with respect to the straights in an adjacent row of straights in the same vertical well. By so arranging the straights, sinuous flue passages 25 are provided which extend from top to bottom of the regenerator. Moreover, the straights in any horizontal row may be offset with respect to the straights in a horizontal row at the same elevation but in an adjacent well, as clearly illustrated in Fig. 5. Gas or air traversing the passages 25 is subjected to frequent changes of direction by the straights 24 so that sufficient turbulence is generated to insure an effective scrubbing action and a maximum interchange of heat between the bricks and the gas or air. By this arrangement, it is possible to effectively prevent any tendency of the gas or air to be piped through the checkerwork, i. e., a flow of a core of hot gas that is surrounded by a colder envelope of the gas.

The checkerwork shown in Figs. 5, 6 and 7 is also provided with vertical flues 26 and horizontal flues 27 corresponding, respectively, to the similar flues 19 and 20 in the modification illustrated in Fig. 1.

The modification illustrated in Figs. 8 to 10, inclusive, distinguishes from that shown in Figs. 1 to 4, inclusive, by employing solid, spaced, vertical walls, each of which is composed of horizontal courses of bricks 28 that are laid in end-to-end relation and resting edgewise on the subjacent course of the same bricks. Each brick 28 is provided with a plurality of notches 29 that are similar to the notch 11, and these notches receive the ends of the straights 30 that space the vertical walls composed of the bricks 27 to provide vertical wells 31 that extend from top to bottom of the checkerwork. If desired, the notches 29 may be disposed so that the straights in each horizontal row of straights in one vertical well 31 is offset with respect to the straights in the horizontal row at the same elevation in the adjacent well. This arrangement, to the extent indicated, is, therefore, similar to that illustrated in Fig. 1.

The notches 29 in each brick 28 are arranged so that one pair of notches extends inwardly from each major face of the brick, but these pairs are in the offset relation illustrated in Fig. 9. In addition to the notches 29, other notches 32 are provided in each brick 28 and each of these notches is cut inwardly from an end face thereof. Each notch 32 is defined by a horizontal bearing surface 33, a vertical end surface 34, and a vertical back surface 35, and the notch thus formed is located in complementary relation to a similar notch in the adjacent brick, so that when a pair of the bricks are laid in end-to-end relation, a complete notch is provided to receive one end of a straight 30.

The disposition of the straights 30, in conjunction with the solid vertical walls, defines a series of flues 36 that extend from top to bottom of the checkerwork in each vertical well 31, but communication between the vertical flues in each vertical well is provided by the vertical spacing of the straights 30, as illustrated in Fig. 10, and this space is designated by the numeral 37.

Each of the checkerwork modifications above described is characterized by a maximum stability of structure due to the highly effective interlock provided between the straights and the notched bricks. This interlock not only provides adequate, horizontal bearing surface for the straights, but the vertical end and back walls of each notch positively prevent any tendency of the bricks to slip sidewise or endwise due to vibration or shocks arising from any reasonable cause. Such slippage in other types of checkerwork frequently closes a number of the flue passages through the checkerwork and so disables to that extent the regenerative capacity of the structure.

One of the principal advantages of the structures above described resides in the employability of a relatively large number of straights in the complete assembly. Straights may be manufactured at a considerably lower cost than what might be termed special or notched types of brick, and the capacity of my improved checkerwork assembly to employ approximately fifty percent of straights in the total structure is reflected in a marked economy in structural costs.

Moreover, the provision of horizontal and vertical flue passages in the types illustrated in Figs. 1 to 7, inclusive, insures that the gas or air pressure will be uniform throughout the checkerwork assembly, so that, if any portion of some of the flue passages should be clogged for any reason, the gas or air may readily flow through all unclogged passages and thus utilize to the fullest possible extent the regenerative capacity of the furnace. Whenever desired, the sizes of the notched bricks and straights in any part of the furnace may be increased to enlarge the horizontal or vertical flues or both, to facilitate lancing and the introduction of steam or air pipes, or other cleaning apparatus.

In Figs. 11 to 15, inclusive, there is illustrated a regenerative furnace which has particular advantages when used as a blast furnace stove and which includes checkerworks A, B and C that are respectively located in the upper, intermediate and lower zones of the complete assembly. Each of the checkerworks A, B and C may be composed of as many courses of bricks as operating conditions require, i. e., their respective heights may be varied as desired.

Referring to Fig. 11, which illustrates a plan, sectional view of checkerwork A, the latter is composed of a plurality of spaced, vertical solid walls 38 which define a plurality of vertical wells 39 that extend from top to bottom of the checkerwork assembly, i. e., throughout the height of the stove. Each of the walls 38 may be composed of a plurality of superposed courses of notched bricks, such as have heretofore been described, and with the notches therein disposed to secure the spacing and disposition of the cross members hereinafter described. The wells 39 are spanned by horizontal rows of straights 40 that are superimposed upon each other to provide vertical flue passages 41 that extend from top to bottom of the checkerwork zone A. If desired, the straights 40 in one well may be offset with respect to the straights in an adjacent well at the same elevation, as indicated in Fig. 11.

In checkerwork B, the vertical wells 39 are spanned by special bricks 42 whose ends are received within the notches in the vertical walls 38, and extending from the opposite major surfaces of each brick 42 are bosses or lugs 43 that may have the shape generally indicated in Fig. 12 or other shapes as desired. The bosses 43 of adjacent bricks 42 in each horizontal row stand in opposed relation and serve to define a vertical flue passage 44 having a cross-sectional area less than the similar area of the flue passage 41, for a purpose presently explained.

In the checkerwork C, the cross members 45 are also in the form of special bricks that may have the same general shape as the bricks 41, but the bosses or lugs 46 are larger than the bosses 43, so that the vertical flue passage 47 thereby defined is characterized by a smaller cross-sectional area than the flue passage 44.

It will be understood that, in each vertical well 39, the straights 40 in checkerwork A are arranged in a series of spaced, vertical files, with the bricks in each file in vertical alignment, and that the same condition exists in checkerworks B and C with respect to the special bricks 42 and 45. It will also be understood that the respective files throughout the height of the stove have their respective cross member elements in alignment, so that, considering any particular vertical file, it will include from top to bottom of the stove a successive series of straights 40, and the special bricks 42 and 45, all of which are in alignment. Accordingly, as a hot gas flows through the stove, it will successively pass through flue passages of decreasing cross-sectional areas, so that effective compensation is thereby provided for the gradually decreasing temperature and consequent shrinkage in the unit volume of the gas, thus insuring an effective interchange of heat in the lowermost zones of the stove. When the flow through the stove is reversed, the increasing unit volume of the air due to rise in temperature is adequately handled by the increase in the flue areas. Moreover, the bosses 43 and 46 serve to generate sufficient turbulence in the flowing medium, regardless of direction of flow, to secure an optimum interchange of heat.

I claim:

Checkerwork for regenerators comprising in combination, a plurality of superposed groups of horizontal courses of notched bricks, each being shaped as a parallelopiped, the respective courses of the groups being vertically aligned, and straights spacing the groups vertically and the courses in each group horizontally to form vertical and horizontal passages through the checkerwork, each notch being defined by a horizontal bearing surface on which one end of the associated straight rests, and surfaces normal to the bearing surface for respectively engaging the sides and end of the straights to restrain lateral and endwise movements thereof.

HENRY TANNER.